Aug. 25, 1964     F. J. GARDINER     3,145,909
PRESSURE TRANSFORMER
Original Filed Jan. 7, 1953     5 Sheets-Sheet 1
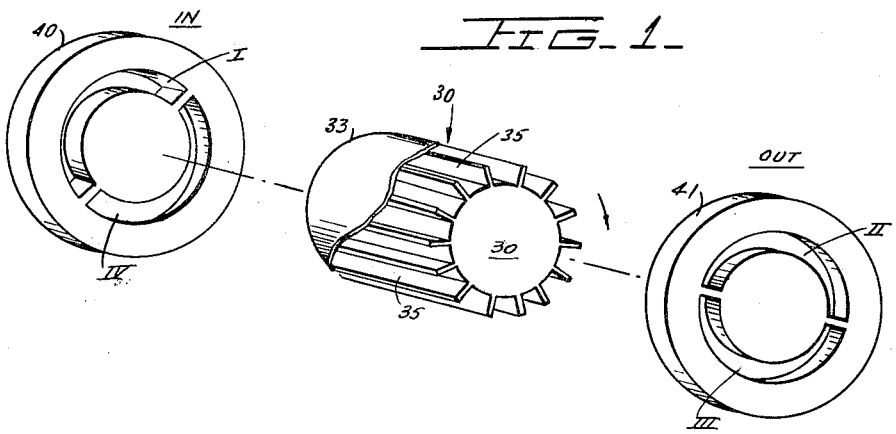
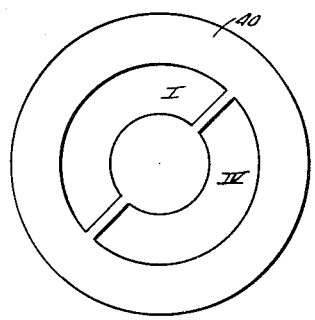
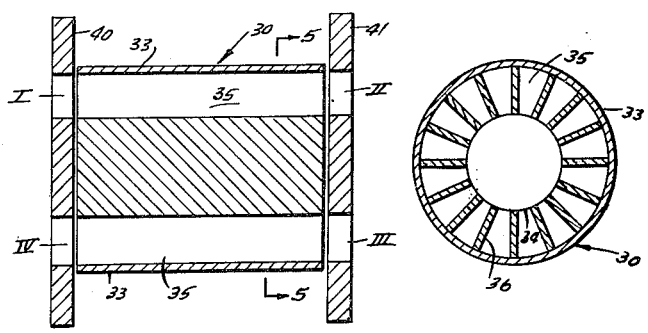
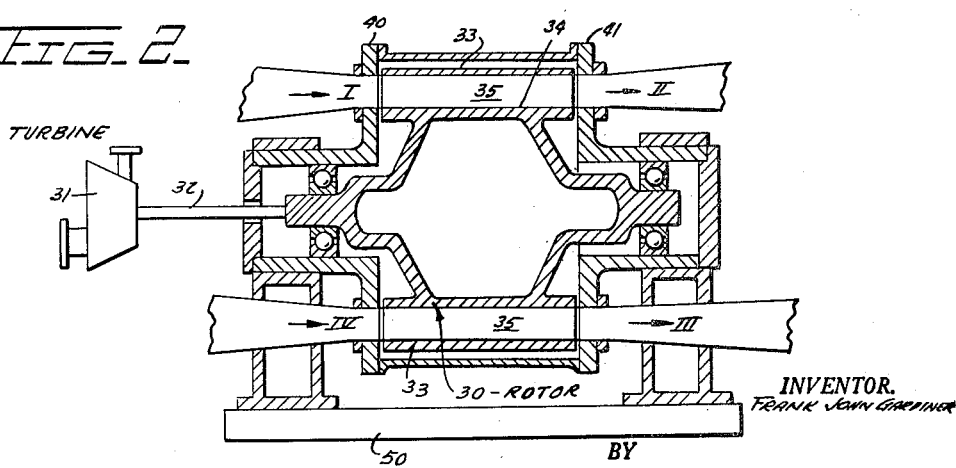
INVENTOR.
FRANK JOHN GARDINER
BY
Ostrolenk & Faber
ATTORNEYS

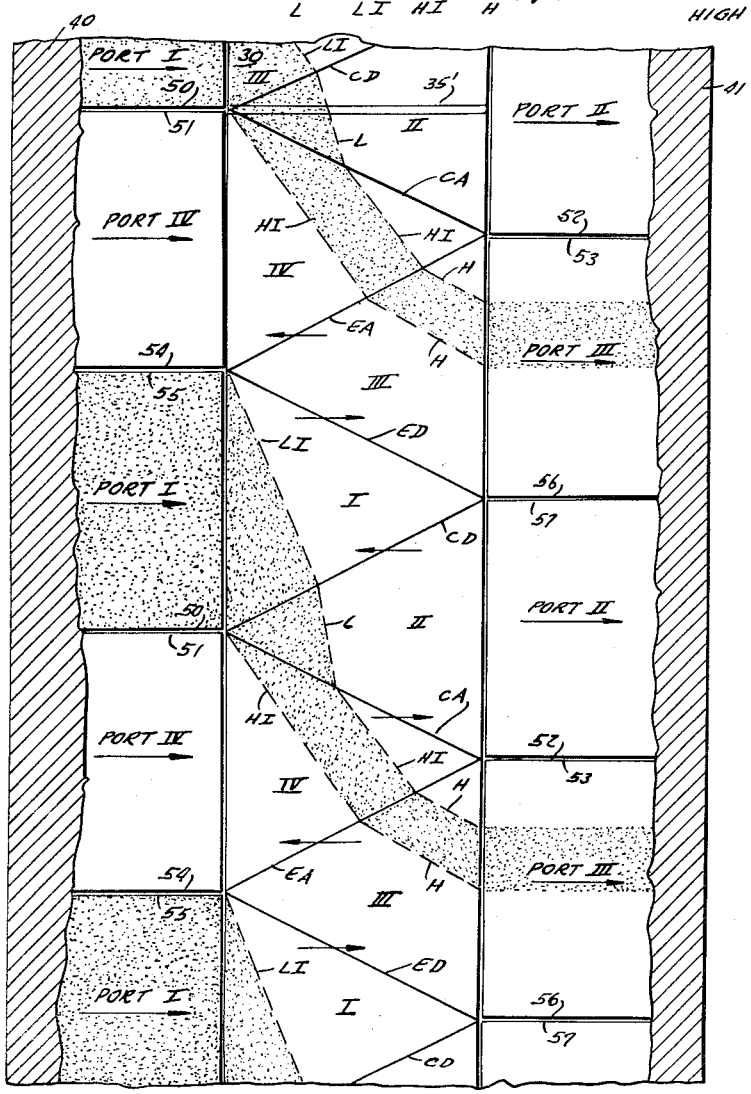

Aug. 25, 1964     F. J. GARDINER     3,145,909
PRESSURE TRANSFORMER
Original Filed Jan. 7, 1953     5 Sheets-Sheet 3

STATE I - LOW PRESSURE, MEDIUM VELOCITY
STATE II - MEDIUM PRESSURE, HIGH VELOCITY
STATE III - MEDIUM PRESSURE, ZERO VELOCITY
STATE IV - HIGH PRESSURE, MEDIUM VELOCITY

INVENTOR.
FRANK JOHN GARDINER
BY
Ostrolenk & Faber
ATTORNEYS

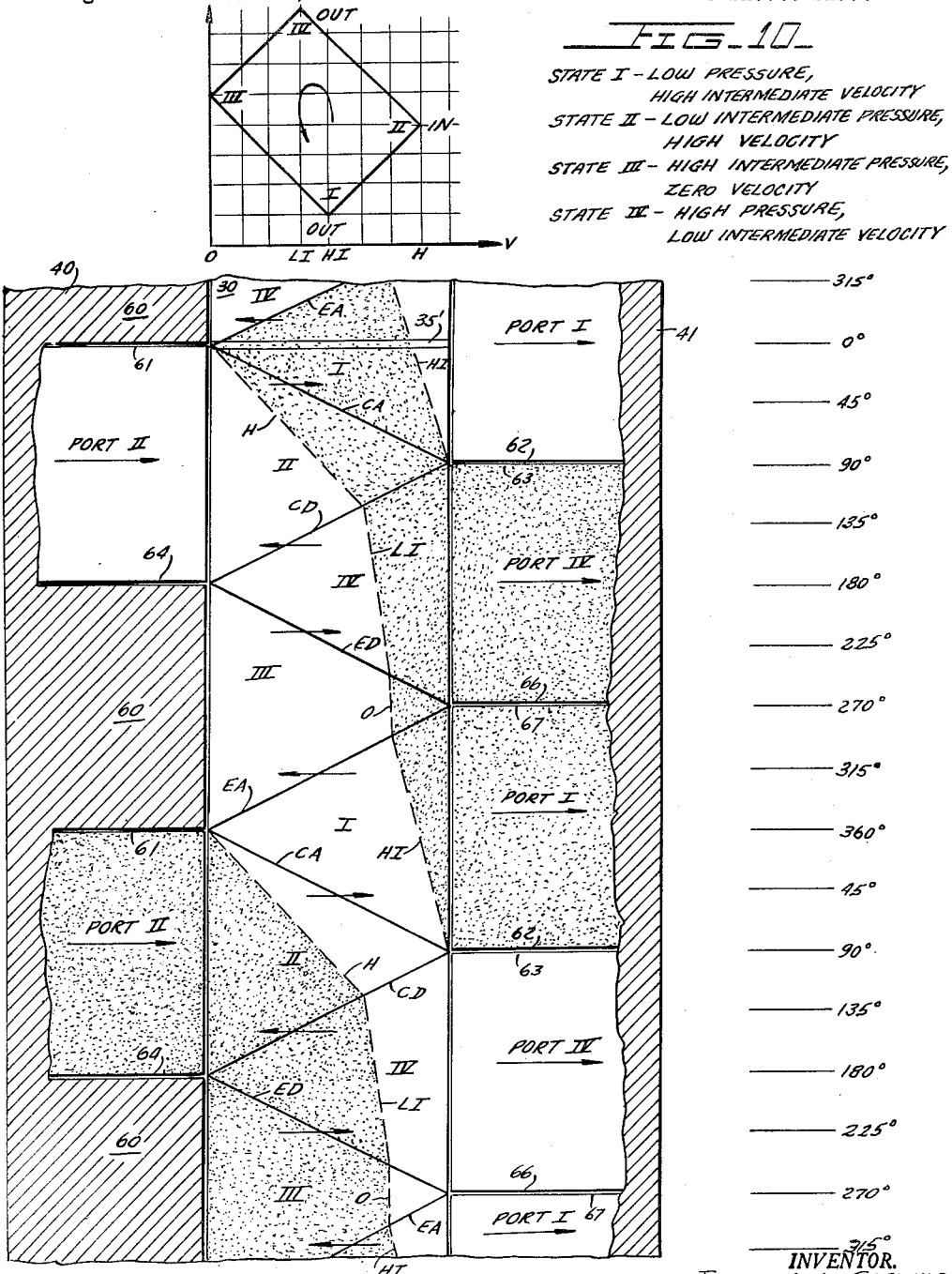

Aug. 25, 1964 F. J. GARDINER 3,145,909
PRESSURE TRANSFORMER
Original Filed Jan. 7, 1953 5 Sheets-Sheet 5

STATE I - LOW PRESSURE,
MEDIUM VELOCITY (M)
STATE II - LOW INTERMEDIATE PRESSURE
HIGH VELOCITY (H)
STATE III - HIGH INTERMEDIATE PRESSURE
NEGATIVE MEDIUM VELOCITY (M)
STATE IV - HIGH PRESSURE,
ZERO VELOCITY (O)

INVENTOR.
FRANK JOHN GARDINER
BY
Ostrolenk & Faber
ATTORNEYS

United States Patent Office 3,145,909
Patented Aug. 25, 1964

3,145,909
PRESSURE TRANSFORMER
Frank John Gardiner, Bryn Mawr, Pa., assignor to I-T-E Circuit Breaker Company, Philadelphia, Pa.
Continuation of application Ser. No. 330,021, Jan. 7, 1953. This application Apr. 26, 1957, Ser. No. 655,441
11 Claims. (Cl. 230—69)

My invention relates to a pressure transformer in which aero-dynamic effects, known as instationary flow phenomena, as contrasted with stationary flow phenomena, form the primary basis of the machine, and is particularly directed to a "Pressure Transformer" wherein any combination and magnitude of pressure of output fluids can be obtained whereas in the prior art "Pressure Exchangers" the only combinations and magnitudes of pressure available at the output are those which are available at the input.

My present application is a continuation of co-pending application entitled "Pressure Transformer," Ser. No. 330,021 filed January 7, 1953, and now abandoned.

The "Pressure Transformer" of my invention utilizes aero-dynamic effects known as instationary flow phenomena. That is, the effects of the compression and expansion waves, which are created when the fluids at different energy levels are brought into contact with each other, are utilized in obtaining a useful output fluid therefrom.

In a rotary compressor, compression and expansion waves are generally considered objectionable. However, aero-dynamic wave machines, the category in which applicant's device is classified, provides precise timing operation to utilize this effect so that it will be the essence of the operation of the machine rather than a hindrance or disadvantage of the machine.

Applicant is not the first to utilize aero-dynamic waves in the operation of a pressure device. In the known, prior art, the utilization of instationary flow phenomena in an aero-dynamic wave machine has been utilized in "pressure exchangers." A "pressure exchanger" unit is shown in the Seippel Patent 2,399,394 and co-pending application A-16, Ser. No. 454,774, filed September 8, 1954 now U.S. Patent 2,970,745 issued Feburary 7, 1961 in the name of Max Berchtold, entitled "Wave Engine" and assigned to the assignee of the instant invention, and an application of this device is shown in the Seippel Patent 2,461,186. Basically, this machine has supplied to it an available gas at high pressure and a supply of air at a low pressure. It is an object of the "pressure exchanger" to exchange the static pressures of the gas and the air. Thus, at the pick up port of the "pressure exchanger" there is the air at the initial high static pressure of the available gas and at the exhaust port the gas is exhausted at the initial low static pressure of the air. Thus, available gas is introduced into the rotor of the "pressure exchanger" through the inlet port at a high static pressure $P_2$ and the air is taken from the pick up port at this same static $P_2$. The air is introduced to the rotor through the scavenging port at a low static pressure $P_1$ and the gas is exhausted from the machine at exhaust port at the initial low static pressure $P_1$ of the air. Thus, the "pressure exchanger" of prior art device merely exchanges the pressures between the available gas and air so that the gas changes from a pressure $P_2$ to $P_1$, whereas the air changes from the pressure of $P_1$ to $P_2$. Thus, the device is properly termed a "pressure exchanger." It is essential that this point be understood in order to properly distinguish applicant's "pressure transformer" from the prior art device "pressure exchangers" illustrated in the aforementioned Seippel Patent 2,399,394.

The prior art "pressure exchanger" is constructed so that for any given condition the ports located and positioned with respect to each other to permit an aero-dynamic wave generated at the leading edge of one port to terminate at the leading edge of its opposite port, and to permit an aero-dynamic wave generated at a trailing edge of one port to terminate at a trailing edge of its opposite port. Thus, a compression-acceleration wave (CA) created at the leading edge of the inlet port terminates at the leading edge of the pick up port, whereas the expansion-deceleration wave created at the trailing edge of the inlet port terminates at the trailing edge of pick up port. Thus, a wave created at a leading edge of one port always terminates at the leading edge of its opposite port and a wave created at a trailing edge of one port always terminates at a trailing edge of its opposite port.

This construction of an aero-dynamic wave machine renders it a "pressure exchanger" in which gas enters at pressure $P_2$ and leaves at pressure $P_1$, whereas air enters at pressure $P_1$ and leaves at pressure $P_2$.

In contradistinction, applicant constructs his pressure transformer by locating and positioning the ports relative to each other so that all waves created at the leading edge of a port terminate at the trailing edge of its opposite port to thereby achieve a "pressure transformer" rather than a mere "pressure exchanger."

Applicant's "pressure transformer" utilizes aero-dynamic wave principles known as instationary flow phenomena, but does so with a structural operation and purpose which bears little or no relation to the prior art "pressure exchanger" illustrated in Patent 2,399,394. Applicant's pressure transformer starts with fluids which are available at, for example, pressure $P_1$ and $P_2$ and transforms these fluids to pressures other than the original pressures such as $P_3$ and $P_4$. Thus, for example, there is supplied to the machine fluids A and B which are respectively at pressures $P_2$ and $P_1$ and there is taken from the machine fluid A(B) at pressure $P_3$ and fluid B(A) at pressure $P_4$. Note that rather than a mere exchange of pressure between fluids there is actually a transformation of pressures. Thus, applicant's pressure transformer can start with a fluid A at a pressure $P_2$ and transform this same fluid to an output fluid A at pressure $P_3$ and at the same time start with a fluid B at pressure $P_1$ and transform the same fluid to an output fluid B at a different pressure $P_4$. This operation must be clearly distinguished from the prior art "pressure exchanger" where available fluid A at pressure $P_2$ exchanges its pressure with a fluid B so that it is at the output at a pressure $P_2$ and the fluid A is then exhausted at a pressure $P_1$ which is equal to the pressure of the input fluid B, namely $P_1$.

In devices utilizing the principles of applicant's "pressure transformer," any combination and magnitude of pressure of the output fluids can be obtained whereas in the prior art "pressure exchanger" the only pressures which are available at the output are those pressures which are available at the input. This is a basic and fundamental difference between applicant's "pressure transformer" and the prior art "pressure exchanger."

Applicant achieves his desired "pressure transformer" by positioning and locating the ports so that an aero-dynamic wave generated at one edge of a port will not terminate at a corresponding edge of the opposite port. That is, a wave generated from the leading edge of one port will terminate at the trailing edge of its opposite port not at the leading edge as is the case in a "pressure exchanger." This is a basic structural distinction between the "pressure transformer" and the prior art "pressure exchanger."

Accordingly a primary object of my invention is to provide a "pressure transformer" wherein the output fluids are at a pressure $P_3$ and $P_4$ which are not equal to the pressure $P_1$ and $P_2$ of fluids supplied to the machine as distinguished from the prior art "pressure exchangers" where the output fluids must be at a pressure $P_1$ and $P_2$ which are equal to the pressures $P_1$ and $P_2$ of fluid supplied to the machine.

Another object of my invention is to provide a "pressure transformer" in which the ports are positioned and located with respect to each other so that a wave created at a leading edge of one port will terminate the trailing edge of the opposite port as distinguished from the prior art "pressure exchanger" wherein the ports are positioned and located with respect to each other so that a wave created at a leading edge of one port will terminate at the leading edge of another port or a wave created at a trailing edge will terminate at a trailing edge of another port.

An object of my invention is to provide a novel pressure transformer which can be readily and easily adapted for three or four stream operations depending on the energy level of the available fluids and required output fluids.

Another object of my invention is to provide a novel machine utilizing the instationary flow phenomena in which a single input fluid can be transformed into two output fluids each at different pressures and at pressures which are different from that of the available fluid.

A further object of my invention is to provide an aerodynamic machine in which all the energy is derived from the available input fluids and in which two input fluids can be transformed into a single output fluid at a pressure different from either of the available fluids.

These and other objects of my invention will be apparent in the following description when taken in connection with the drawings, in which:

FIGURE 1 is a schematic perspective view showing the rotor containing a plurality of cells and also illustrates the input and output ports in the stator discs which are positioned on either end of the rotor.

FIGURE 2 is a schematic cross-sectional view showing the rotational mounting of the rotor and the stationary mounting of the stator discs containing the input and output ports.

FIGURE 3 is an end view of a stator disc containing two ports.

FIGURE 4 is a cross-sectional longitudinal section taken through the rotor and stationary disc.

FIGURE 5 is a cross-sectional view taken along the line 5—5 of the rotor of FIGURE 4 and shows the blades hub and shroud of the rotor.

FIGURE 6 is a state diagram showing one typical cycle for my novel pressure splitter and illustrates the state of the fluids at the various ports within the machine. This diagram is illustrative of a cycle of operation for a machine having two input ports and two output ports (four stream operation) wherein the fluid always moves in one direction through the rotor.

FIGURE 7 is a schematic developed view of the rotor and associated ports showing the changing condition of the fluid in one cell of the rotor as it is continuously moved past the input and output ports. The conditions illustrated in FIGURE 7 are those resulting when the available fluids are at the energy levels indicated in FIGURE 6. This view illustrates the energy level of the fluid in the cell at various positions thereof, and can therefore be used to determine the pressure and velocity of the fluid at any particular rotational angle of a particular cell. It will be noted that this view may be considered either as a moving picture of a condition of the fluid in one cell as it progressively completes a 360° rotation or may be considered a snapshot view showing the condition of the fluid in all of the cells at any particular instant.

Figure 8:
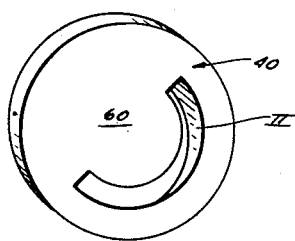

FIGURE 8 is an end view similar to FIGURE 3 showing the construction of a disc when the pressure splitter is operated with a single available fluid at one energy level.

Figure 9:
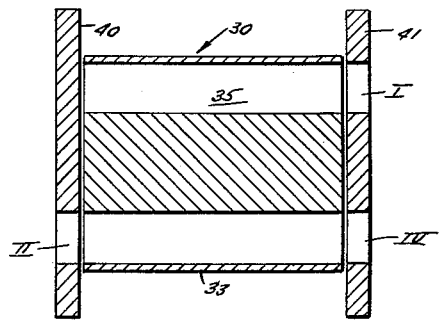

FIGURE 9 is a cross-sectional longitudinal view through the rotor and stationary ports similar to the view of FIGURE 4 but showing one disc with a single intake port as noted in FIGURE 8.

FIGURE 10 is a state diagram similar to FIGURE 6 showing a second typical cycle for my novel pressure splitter. In the state diagram illustrated in FIGURE 10 there is a single input port and two output ports (three stream operation) and hence the apparatus used is as shown in FIGURES 8 and 9. The fluid at state III is on the zero flow line thereby indicating that it can neither be an input or output port but instead is a state of the flow at a particular time within the cells.

FIGURE 11 is a schematic developed view of the rotor and ports showing the condition of the fluid in a particular cell as it continuously rotates past the input and output ports. It will be noted that this figure is similar to FIGURE 7 but shows the condition in the cells when the pressure transformer is operating under the cycle indicated in FIGURE 10.

Figure 12:
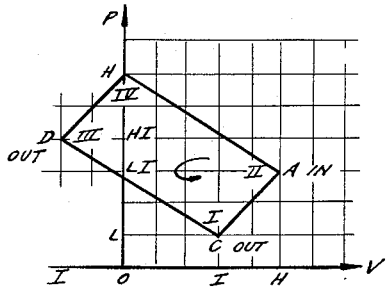

FIGURE 12 is a state diagram showing a third typical cycle for a pressure splitter. The cycle of operation indicated in FIGURE 12 differs from that shown in FIGURE 10 in that the rectangle falls on the right and left side of the ordinate, thereby indicating that the fluid flows in two directions within the cells of the rotor during a single complete rotation thereof. The state diagram of FIGURE 12 differs from the state diagram of FIGURE 6 by illustrating a cycle of operation for apparatus having a single input port with fluid at state II and two output ports (three stream operation).

Figure 13:
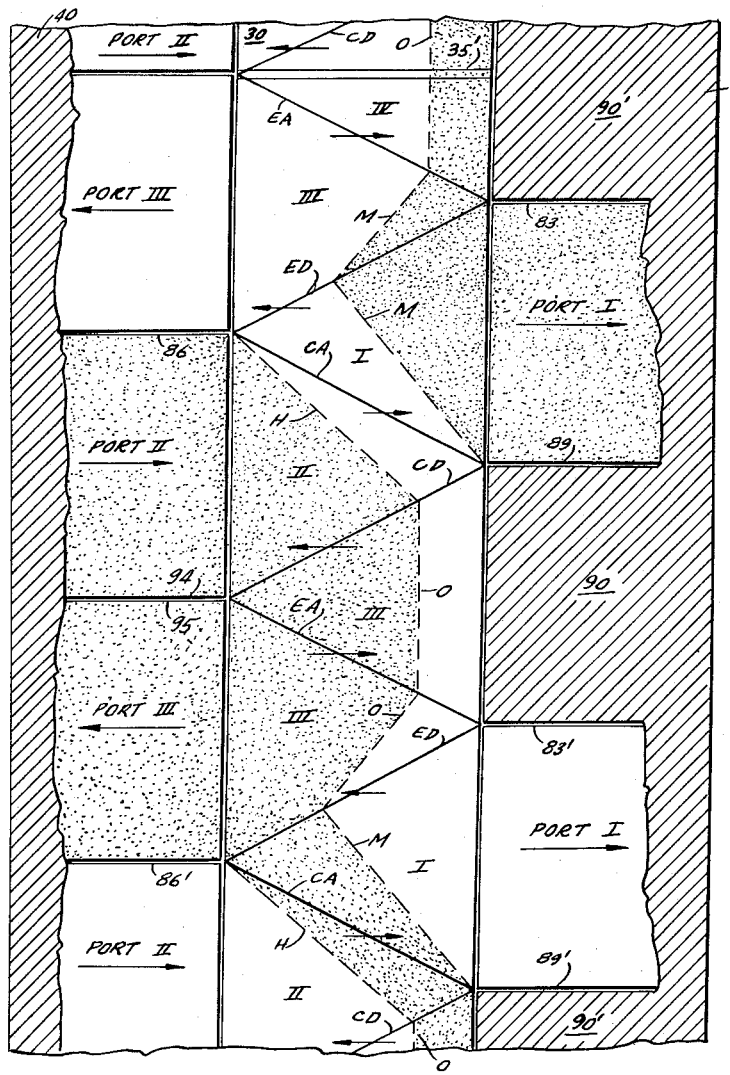

FIGURE 13 is a schematic developed view of the condition of the fluid within any particular cell as it successively passes the input and output ports. This figure illustrates the conditions existing when the pressure transformer is operating through the cycle indicated in FIGURE 12 and is similar in purpose to FIGURES 7 and 11. That is, FIGURE 13 may be considered either as a moving picture of the condition existing within any particular cell as it rotates through the complete 360° cycle or may be considered as a snapshot of the condition existing in all of the cells at any one particular time.

Figure 14:
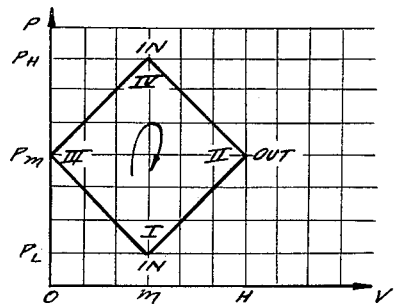

FIGURE 14 is a state diagram showing another typical cycle of operation for my novel pressure transformer. This cycle is an approximate representation of the reverse operation of the cycle of FIGURE 10.

Referring now to FIGURES 1 through 5, the rotor 30 is driven at high speed rotation about its axis by any suitable means such as turbine 31 which is connected to the rotor 30 by shaft 32. The rotor 30 has a hub 34 and an outer shell or shroud 33. A plurality of vanes 36 extend from the tub 34 to the shroud 33 and are permanently secured thereto in any desirable manner such as brazing.

The space between the vanes 36 form a plurality of cells or channels 35 through which the fluid will flow. The cells or channels 35 may extend parallel to the longitudinal axis of the rotor 30, as shown in the figures, or the vanes 36 may be constructed and positioned so that the resulting cells 35 wind helically on the rotor 30.

The stator discs or plates 40 and 41 are placed on opposite sides of the rotor 30 in the closest possible proximity thereto consistent with high speed requirements in the rotor to obtain the best possible fluid seal.

Thus, as seen in FIGURE 2, the stator discs or plates 40 and 41 are rigidly mounted on the base 50 and the rotation of the rotor 30 by the turbine 31 causes the plurality of cells 35 to rotate past the input and output ports IV–I and III–II, respectively.

In one embodiment of my invention the pressure transformer is operated with two input ports and two output ports. The state diagram of FIGURE 6 illustrates this condition.

The ordinate of FIGURE 6 is the absolute pressure (P) of the fluid which is an approximation for the velocity of sound ($a$) which is equal to $\sqrt{KgRT}$. The abscissa is dimensioned in velocity of mass rate of flow (V) where V is the local fluid velocity
$a$ is the local velocity of sound
K is the ratio of specific heats $CP/CV$
R is the gas constant for the particular fluid
$g$ is the gravitational constant
T is the absolute temperature.

These quantities are related by the approximately isotropic formula $$\Delta V = \frac{K-1}{2} \Delta a$$

and $$\Delta P = \frac{K-1}{2K} \left(\frac{P}{a}\right) \Delta a$$

where $\Delta V$ is the change in flow velocity and $\Delta a$ is the change in local velocity of sound and $\Delta P$ is the change in pressure. That is, the absolute pressure (P), which is an approximation for the velocity of sound ($a$), forming the dimensions of the ordinate, is related to the mass flow or velocity (V), which is the dimension of the abscissa by the above-mentioned approximate formula.

Since the ratio of specific heat K is a constant for any particular fluid or gas, it will be seen, using air as an example, where $K=1.4$, that $5\Delta a = \Delta V$, so that a five unit change in the mass flow or velocity (V) of the particles of the fluid will result in a one unit change in the velocity of sound ($a$).

Thus, it will be seen that a state diagram similar to FIGURE 6 drawn for any cycle of operation for any particular available fluid will have the various states of the fluid joined by straight lines along a positive or negative angle and a complete cycle will therefore have a parallelogram form. Hence, with this relationship, the designer can select a parallelogram cycle which will achieve the desired pressure levels and enable him to predict the mass flow distribution therefrom. By suitable choice of ordinate scales, the cycles can of course always be made rectangular.

In the construction of the state diagram of FIGURE 6 it is assumed that there are two available fluids, one at state IV having a high pressure and high medium velocity and another at state I having a low pressure and low intermediate velocity. By plotting these two points indicating state I and state IV the rectangular cycle noted can be constructed to thereby indicate that fluid at the output ports will be at state III having a high intermediate pressure and a high velocity and at state II having a low intermediate pressure and a low velocity.

It will also be noted that the state diagram of FIGURE 6 may be constructed in a reverse manner; that is, if it is desired to obtain fluids at a predetermined pressure and velocity the designer can then determine the pressure and velocity required for the available fluids. That is, if it is desired to have output fluids at states II and III these two points can be plotted on the graph of FIGURE 6 and the rectangle shown can be constructed to thereby indicate to the designer that it will be necessary to have available fluids at states I and IV.

It should be noted that the pressure transformer of my novel invention can also be used with a single input and two outputs; that is, in the event an available fluid is to be transformed into two fluids having respectively a high and low pressure, the modifications as shown in state diagram 10, 12 and 14 can be used and will hereinafter be more fully described.

FIGURE 7 is a schematic developed view of the condition existing within any one cell 35' as it progressively rotates through the complete cycle of operation and shows the conditions existing for the cycle of operation of FIGURE 6. It will be noted that FIGURE 7 may also be considered a snapshot view of the conditions existing in all of the cells at any one particular time.

In the operation of the pressure transformer for the cycle of FIGURE 6 the plate or stator disc 40 is positioned on one side of the rotor 30 and is provided with two ports IV and I for the input of fluids at high pressure and high intermediate velocity (state IV) and low pressure and low intermediate velocity (state I), respectively. The plate or stator disc 41 is positioned on the other side of the rotor 30 and is provided with port II for the output of fluids at low intermediate pressure and low velocity (state II) and port III for output of fluid at high intermediate pressure and high velocity (state III).

The rotor 30 is rotated by the turbine 31 at a speed which will produce the required timing so that the wave front created by the leading edge of one port will traverse the entire length of the cell and reach the opposite end thereof at the same time that the trailing edge of the opposite port is reached by the cell.

The "pressure transformer" of my invention has a rotor and stator plates which are similar to the components used in a "pressure exchanger." However, there is a physical difference between these two devices in both the location and relative position of the various ports within the stator plates. Thus, in my novel "pressure transformer" each port is physically positioned and located so that the wave within the rotor will terminate on the trailing edge of the port. Thus, as seen in FIGURE 7, port II is physically positioned with respect to port IV so that the wave CA created at the leading edge 51 of port IV will terminate on the trailing edge 52 of port II; port IV is physically positioned and located with respect to port III so that the wave EA created at the leading edge 53 of port III will terminate on the trailing edge 54 of port IV; port III is physically positioned with respect to port I so that the wave ED created at the leading edge 55 of port I will terminate on the trailing edge 56 of port III; port I is physically positioned and located with respect to port II so that the wave CD created at the leading edge 57 of port II will terminate on the leading edge 50 of port I; etc. It will therefore be seen that all ports are physically positioned and located so that a wave created at a leading edge of one port will terminate at a trailing edge of an opposite port whereas the prior art pressure exchange had the ports physically positioned and located so that a wave created at a leading edge of a port always terminated at a leading edge of a port a wave created at a trailing edge of a port always terminated at a trailing edge of a port. Thus, as can be seen from FIGURE 7 that a pair of waves straddle each port. For example wave ED and CD straddle port I; wave CD and CA straddle port II; wave CA and EA straddle port IV and waves EA and ED straddle port III. Thus the pressure existing at any given port is confined to that port. Also it is noted that as one passes from any port to any other port there is always a wave located therebetween. Thus, for example, there is wave CA between ports IV and II; wave EA between port IV and III; wave ED between ports III and I; wave CD between ports I and II, etc. Hence at least joining ports such as IV and II, or IV and III or III and I, etc. are never at the same pressure due to the waves which exist between them.

As a result of the partial structural arrangement for positioning and locating the ports to achieve the above noted rotor condition, I have invented a "pressure transformer" wherein the output fluids are at pressures which are not equal to pressure of the fluid supplied to the machine whereas in the prior art "pressure exchanger" the output fluids must be at pressures which are equal to the pressures of the fluid supplied to the machine.

As noted, FIGURE 7 may be considered a snapshot view or a moving picture of the individual cells of the rotor as they are moved successively past opposite ports IV and III and then I and II, showing the creation and propagation of various waves and the resulting pressure interchanges. In this figure the available fluid at high pressure and high intermediate velocity which is introduced at port IV is represented by the plain area in the port. Although this fluid is subsequently changed to several other states, as indicated, the particles which are introduced at state IV through port IV are always indicated by the plain area. The particles of the other available fluid which are introduced at port I in state I, although subsequently changed to several other states, is indicated by the dotted area. The velocity of movement of the particles of the respective fluids are indicated by the dashed diagonal lines wherein a vertical line represents zero velocity and a horizontal line represents infinite velocity.

It will be noted that the available fluids at states I and IV are always present at the input ports I and IV and the cells 35 of the rotor 30 are continuously moving past the ports I, II, III and IV. Thus a cycle, for the purpose of description, may start at any point. For example, the initial description will start with a cell 35' at zero degrees, and indicated at the right of FIGURE 7. This cell is opened to the output port II at its right end and is in the process of passing from the trailing edge 50 of the input port I to the leading edge 51 of the input port IV at its left end.

Thus, at this instant of change the entire cell is occupied by fluid at state II, low intermediate pressure and low velocity. However, as the cell advances to the point where its left end is opened by the leading edge 51 of port IV, the fluid in the cell at state II will be impinged upon by the available fluid entering through the port IV at state IV. Due to the difference in energy level of these two fluids, a wave front CA will be created at leading edge 51 which will advance through the fluid in the cell at a speed greater than the high intermediate velocity advancement of the fluid at state IV.

The diagonal dotted line HI indicates the velocity of the fluid particles which have been introduced into the cell through the port IV. Thus, the line HI will represent the high intermediate velocity of the fluid at state IV.

It will be noted that all of the fluid in the cell to the left of the wave front CA will be at state IV and all of the fluid on the right of the wave front CA will be at state II. That is, the advancement of the wave front CA through the fluid in the cell 35' will change the energy level or velocity and pressure of the fluid in accordance with the energy level or pressure of the fluid at state IV in port IV.

Accordingly, the wave front CA and the wave front CD, ED, EA hereinafter more fully described will represent boundary lines which demark fluid at different energy levels or states. Thus, for example, the wave front CA will be the boundary line between the fluid at state II and state IV.

On the other hand, the velocity line HI as well as the other velocity lines H, LI, L, will indicate the separation of fluid particles which are already in the cell at the time it approaches the leading edge of a particular input port such as port IV or port I and fluid particles which are introduced into the cell from the particular port.

For example, the velocity line HI will have fluid on the right and left side thereof which is at state IV but (1) the fluid at the right of the left velocity line HI which is indicated by the dotted area, is the fluid which is introduced into the cells from input port I and which was in the cell as it passed the leading edge of the port IV and (2) the fluid at the left of the left velocity line HI, which is indicated by the plain area, is the fluid which was introduced into the cell through the port IV when it passed the leading edge 51 and which was in the cell when the cell was at the position 0°.

Thus, it will be noted that the wave front CA which is created at the leading edge 51 of the port IV will traverse the length of the cell and arrive at the extreme right hand end thereof at the same time that the cell 35' reaches the trailing edge 52 of the output port II. That is, the ports II and IV are physically positioned and located with respect to each other for any given rotor dimension and speed so that the time interval for the passage of a wave front from one end to the other is equal to the time interval for the cell to rotate from the leading to trailing edges of the opposite adjacent port.

It will also be noted that the wave front CA which transforms the fluid from low intermediate pressure at state II to high pressure at state IV is a compression wave which accelerates the fluid from the low velocity of state II to the low intermediate velocity of state IV and travels downstream. That is, a compression acceleration wave (CA) will travel in the same direction as the fluid particles.

As the cell 35' reaches the position of 90°, it will be filled entirely with fluid particles that have been transformed to an energy level at state IV. That is, the fluid in the cell 35' which existed to the right of the left velocity line HI will have been transformed by the wave CA from fluid at an energy level at state II to fluid at an energy level at state IV.

As the cell 35' passes the 90° mark, the fluid therein at state IV will be exposed to the fluid in the output port III which is at state III. Thus, as the cell 35' reaches the leading edge 53 of port III, two fluids at different energy levels will be exposed to each other and thereby create the wave front EA.

As seen in the state diagram of FIGURE 6, and in the developed view of FIGURE 7, the wave front EA will transform the fluid which is at state IV to fluid which is at an energy level of state III. Thus, the wave front EA is considered an expansion-acceleration wave and, as seen in FIGURE 7, will travel upstream against the direction of flow of the fluid particles at states IV and III.

The velocity line H indicates that the fluid particles are now moving at a high velocity as compared with the high intermediate velocity indicated by the velocity line HI.

As heretofore mentioned the ports are physically positioned and located, for any given rotor dimension and speed so that the wave front EA, which was created at the leading edge 53 of port III, will traverse the length of the cell 35' and arrive at the left hand end thereof at the same time that the cell 35' reaches the trailing edge 54 of the input port IV.

That is, when the cell 35' has traveled approximately 180°, its left hand end will be at the trailing edge 54 of the input port IV and the wave front EA will have reached the left hand end thereof. At this point, all of the fluid within the cell will have been transformed to an energy level state III.

It will also be noted that at this point of the cycle of operation, the left hand end of the cell 35' will be at the leading edge 55 of the input port I, thereby permitting the available fluid in this port which is at state I to impinge upon the fluid within the cell which is at state III to thereby create the wave front ED.

As noted, this wave front will transform the fluid from high intermediate pressure and high velocity of state III to low pressure and low intermediate velocity of state I. Thus, the wave ED is an expansion-deceleration wave and flows downstream in the direction of flow of the fluid particles as seen in FIGURE 7.

The velocity line LI indicates that the fluid particles which were previously traveling at high velocity indicated by the velocity line H are now traveling at a low intermediate velocity. Thus, all the fluid in the cells between the right side of the velocity line LI and the wave front ED will have had the flow of its particles altered as above noted due to the wave front ED. The fluid to the left of the velocity line LI indicated by the dotted area will be that fluid which has been introduced into the cell through input port I.

As the cell progresses to the 270° point in the cycle, the wave ED will travel the complete length thereof and the right hand end of the cell will reach the leading edge 56 of the port III. Also, at this point, the right hand end of the cell will be exposed to the output fluid in the port II which is at state II to thereby create the wave CD at leading edge 57. This wave will transform the fluid in the cell from an energy level at state I to an energy level at state II and cause a decrease in velocity from a low intermediate magnitude to a low magnitude as indicated by the velocity line L. Thus, the wave CD is a compression-deceleration wave and flows upstream against the direction of flow of the fluid particles as seen in FIGURE 7.

As the left end of the cell 35' reaches the trailing edge 50 of the input port I or the leading edge 51 of the input port IV at the 360° point, the cycle of operation will again be repeated in the manner set forth above.

Thus, it will be observed that by having available fluids at state IV and state II introduced into the ports IV and I, respectively, it is possible to obtain two output fluids at state III and state II at ports III and II, respectively.

It will also be noted that a 360° rotation of the rotor 30 may include any number of cycles of operation. With the physical arrangement set forth in FIGURES 1 through 5, a complete rotation of the rotor 30 would include one cycle of operation.

If the developed view of FIGURE 7 can be considered an extended view of the rotor 30, then the device would be adapted with two cycles of operation for a single rotation of the rotor 30, thereby incorporating four input and four output ports, for two available fluids and two output fluids, respectively.

With my novel pressure transformer, it is also possible to interchange the flow direction from that shown in FIGURES 6 and 7 so that the fluids in the ports III and II, which are at states III and II, become the input or available fluids and the fluids at ports IV and I which are at states IV and I, become the output fluid. That is, since the cycle of FIGURE 6 is approximately reversible, the same cycle can be used with similar porting in the stators or discs 40 and 41 to give the reverse effect of the device above described.

With the interchange of the flow direction, the cell 35' will successively pass ports II, I, III, IV so that in the developed view of FIGURE 7, the movement of the cell will be from the bottom up rather than from the top down as above described.

With the exception of the velocity lines HI, H, LI and L, the developed view of FIGURE 7 will be a proper representation of the conditions existing in the cell as it progressively moves upwardly for reverse cycle operation.

With this arrangement, it is possible to transform two available fluids having high intermediate and low intermediate pressure to output fluids having a high and low pressure as indicated in the cycle diagram of FIGURE 6.

It will also be noted that my novel pressure transformer can be constructed and operated so that the reverse cycle of FIGURE 6 is a three stream unit having two output fluids at a high and low pressure obtained from a single available fluid which is at an intermediate pressure. This cycle of operation is illustrated in FIGURE 10. With this arrangement there is, of course, a single input port II and the structural arrangement of the stator disc will be as indicated in FIGURE 8.

FIGURE 9 illustrates the longitudinal section through the rotor 30 in the stationary discs 40 and 41 when the pressure transformer is adapted for operation with a single available fluid. In this arrangement, one point of the cycle diagram must fall on the zero line, as indicated in the cycle diagram of FIGURE 10.

The cycle diagram of FIGURE 10 is constructed as follows:

Assuming that there is an available fluid at state II having a high velocity and a low intermediate pressure, and it is desired to obtain an output fluid which is at a higher energy level, for example at state IV, having a low intermediate velocity and a high pressure. Points will be positioned in the state diagram of FIGURE 10 indicating these two states and will be joined by a straight line since, as heretofore noted, the velocity of sound ($a$) may be related to the mass flow or velocity by the approximation $$\Delta V = \frac{K-1}{2} \Delta a$$

Since the absolute pressure (P) dimensioning of the ordinate is approximately proportional to the velocity of sound ($a$) for the particular fluid, it is possible to dimension the abscissa so that all lines on the state diagram will be at a 45° angle. Hence, a second line can be drawn from the point indicating state IV to the zero view line which is indicated as being at state III.

The two 45° lines extending downwardly from the point indicated as states II and III can be thereby constructed and therefore the intersection noted as state I will indicate the energy level of the fluid at one of the output ports.

In order to relate the state diagram of FIGURE 10 to the developed view of FIGURE 11, the available fluid at state II has been indicated as being applied to the rotor 30 through input port II and the output fluids at states IV and I have been indicated as leaving the rotor 30 through output ports I and IV, respectively.

Notation used in FIGURE 11 correspond to the notation used in FIGURE 7 as follows:

CA=Compression-acceleration wave
CD=Compression-deceleration wave
ED=Expansion-deceleration wave
EA=Expansion-acceleration wave
H=High velocity line
LI=Low intermediate velocity line
0=Zero velocity line
HI=High velocity line
State I=Low pressure
State II=Low intermediate pressure
State III=High intermediate pressure
State IV=High pressure The operation of the waves and motion of the particles indicated by the velocity lines, is similar to that described in connection with FIGURES 6 and 7 except when an input port is blocked off (60) due to the fact that state III falls on the zero velocity line or flow line.

In the illustration of FIGURE 11, the fluid introduced through the upper port II is indicated by the plain area and the fluid introduced through the lower port II, although it is the same fluid, is indicated by the dotted area.

In the arrangement set forth in FIGURES 8, 9, 10 and 11, a first output fluid having a high pressure at energy level indicated by state IV and a second output fluid having a low pressure at energy level indicated at state I will be obtained at the output ports IV and I, respectively, from single available fluid which is at low intermediate pressure and having an energy level indicated by state II which is introduced through port II.

Thus, a high pressure fluid at port IV is obtained from low intermediate pressure fluid at input port II by means of aero-dynamic waves wherein no external energy is supplied to the machine other than that derived from the available fluid introduced through port II.

In the two forms of first and second cyclic operations indicated in FIGURES 6, 7, and 10, 11, the fluid particles within cells 35' of the rotor 30 always flow in one direction, namely from left to right as indicated in the developed view of FIGURES 7 and 11.

However, it will be noted that it is also possible to employ a rectangular cycle which straddles the zero velocity line of the state diagram which will indicate that the fluid particles within the cell 35' of the rotor 30 will flow in both directions. In this case, one of the four corners of the cycle rectangle may or may not be on the zero flow line thereby determining whether three or four fluid streams are to be handled.

The requirements of the design will be the determining factor as to whether or not one corner of the rectangle will fall on this zero velocity line.

In the cycle of operation indicated in the state diagram of FIGURE 12, I have shown an arrangement wherein one corner of the rectangle falls on the zero velocity line so that only three ports are required for the operation of the pressure transformer.

It will be noted that if two adjacent corners of the rectangle lie on opposite sides of the zero velocity line, they must then represent opposite velocities on opposite sides of the rotor and thus must be either both input flows or both output flows.

In a construction of the state diagram of FIGURE 12, it is assumed that there is an available fluid at the energy level indicated by state II having low pressure and medium velocity. If the designer wishes to obtain a pressure transformer in which there are only three ports, a 45° line will be drawn from the point indicated at state II to the zero velocity line. The intersection is indicated as state IV which of course will represent high pressure at zero velocity.

If it is desired that one of the output fluids have a pressure which is larger in magnitude than the pressure of the available fluid, for example at a high intermediate value, a 45° line can be drawn from the point indicated by state IV to the left of the zero velocity line to a point which is indicative of high intermediate pressure. This point is indicated by state III in the state diagram of FIGURE 12.

After these three points are obtained, the intersection of the downwardly extending 45° lines from the points indicated at state II and state III will then represent the second output which is indicated by state I. After this rectangular diagram is complete, the designer will then be able to determine the various conditions which will exist in the cells at various angular positions thereof and also the conditions which will exist at the output ports.

The translation of the state diagram of FIGURE 12 is indicated in the developed view of FIGURE 13 which, as heretofore noted, can be considered either as a moving picture of the condition existing in a single cell 35′ as it rotates through the entire cycle or may be considered as a snapshot of the conditions existing in all cells at any particular time. To facilitate the translation of the conditions of the cycle of operation indicated in the state diagram of FIGURE 12, the fluid at state II is indicated at port II, the fluid at state I is indicated at port I and the fluid at state III is indicated at port III. In the developed view of FIGURE 13, the ports II and III are in the stator disc 40 on the left on the rotor 30 and the single output port I is in the stator disc 41 on the right hand side of the rotor 30.

For the purposes of explanation, it is assumed that a single rotation of the rotor will complete two of the cycles of operation indicated in FIGURE 12. Hence, the stator disc 40 will contain two input ports II. Although these two input ports II will introduce fluid into the rotor which has identical energy level, namely state II, I have illustrated the fluid which is introduced through upper port II by the dotted area and the fluid which is introduced through lower port II by the plain area.

The condition existing within the cell 35′ as it rotates through the cycle from zero degrees to 360° is indicated in FIGURE 13 in which notation similar to those used in FIGURES 6, 7, 9 and 10 are employed.

It will be seen that it is possible to use my novel pressure transformer so that the rectangular cycle diagram falls entirely on one side of the zero velocity line as noted in FIGURES 6 and 10. In this case, all of the fluid particles will flow in one direction through the rotor 30. However, when my novel pressure transformer is operated through a cycle indicated by a rectangular cycle diagram which straddles the zero velocity line, as noted in FIGURE 12, the fluid particles will flow in both directions during the period of one cycle as indicated by the positive and negative state of velocity lines M in FIGURE 13.

That is, when my novel pressure transformer is adapted so that the rectangular cycle diagram straddles the zero velocity line, as indicated in FIGURE 12, the fluid particles flow in both directions in the rotor. With this arrangement, it is possible to have a single input port and two output ports, as shown in FIGURE 12, or a single output and two input ports or two input ports and two output ports depending on whether or not one corner of the rectangular diagram falls on the zero velocity line.

A typical cycle of operation for which my novel pressure may be adapted is illustrated in the state figure diagram 14. In this three stream rectangular cycle indicated in FIGURE 14, there are two input fluids at high (state IV) and low (state I) pressure, respectively, resulting in single output fluid having intermediate pressure (state II).

The developed view of the conditions existing in the cell rotor for the cycles indicated in FIGURE 14 is not shown for it it believed that the developed views of FIGURES 7, 11 and 13, respectively, associate with the cycles shown in state diagrams of FIGURES 6, 10 and 12, will readily enable one skilled in the art to interpret these state diagrams to determine the desired information.

It will therefore be seen that a vast number of different types of rectangular cycles can be designed with each type to fulfill a different mission wherein all types can be achieved basically with the structural arrangement shown in FIGURES 1 through 5 wherein but slight modification will be required for the stator discs 40–41 as noted in FIGURES 8 and 9.

Accordingly, my invention encompasses all rectangular cycles of both the three and four stream type. The basic rules of conservation of mass and energy both apply and are approximately automatically fulfilled by the rectangular cycle diagram. Exact calculation can be made to approach exact physical facts as set forth in the heretofore mentioned co-pending applications.

It will be noted that the small amount of rotational energy required may be obtained by suitable selection of the intake relative velocity angles and also by some curvature of the vanes 36 of the rotor cell 35 at the output or input ports. Also, further centrifugal effects may be brought into play by tapering the cells diametrically from one end to the other to thereby change the absolute peripheral velocity of the fluid during its flow through the rotor cell. In addition, helical plates instead of straight plates can be employed in order to alter the angles at the input and output ports of the stator. However, it will be noted that although these structural alterations to the physical embodiment shown in FIGURES 1 through 5, 8 and 9 may be desired for efficient operation of my novel pressure transformer, they form no part of my present invention.

In summary, the instant invention is directed to a "pressure transformer" wherein each port is physically positioned and located to permit a wave created at the leading edge of one port to terminate at the trailing edge of an opposite port so that output fluids are at pressures which are different than the pressures of the input fluids.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. A pressure transformer operating on instationary flow phenomena comprising a rotor, said rotor having a plurality of cells in spaced parallel relation about the outer circumference of said rotor and extending from one side of said rotor to a second side of said rotor; means for rotating said rotor around its axis at high speed, said cells each being open at each end; a first stator disc on one side of the rotor; a second stator disc on a second side of the rotor; at least one port in said first stator disc and at least two ports in said second stator disc, said cells registering with said ports, said ports of said pressure transformer being both input and outlet ports for gases that create waves with said cells when said rotor is rotated with respect to said ports, each of said ports having a trailing and leading edge, said trailing edge of one of said ports in said second stator disc being physically positioned and located with respect to said leading edge of said port in said first stator plate, whereby a wave created at said leading edge of said port in said first stator disc will terminate on said trailing edge of one of said ports in said second stator disc.

2. A pressure transformer operating on instationary flow phenomena comprising a rotor, said rotor having a plurality of cells in spaced parallel relation about the outer circumference of said rotor and extending from one side of said rotor to a second side of said rotor; means for rotating said rotor around its axis at high speed, said cells each being open at each end; a first stator disc on one side of the rotor; a second stator disc on a second side of the rotor; a port in said first stator disc, and a first and second port in said second stator disc, said cells registering with said ports, said ports of said pressure transformer being both input and outlet ports for gases that create waves with said cells when said rotor is rotated with respect to said ports, each of said ports having a trailing and leading edge, said trailing edge of said first port in said second stator disc being physically positioned and located with respect to said leading edge of said port in said first stator disc, whereby a wave created at said leading edge of said port in said first stator disc will terminate on said first trailing edge of said port in said second stator disc, said trailing edge of said port in said first stator disc being physically positioned and located with respect to said leading edge of said second port in said second stator disc whereby a wave created at said leading edge of said second port in said second stator disc will terminate on said trailing edge of said port in said first stator disc.

3. A pressure transformer operating on instationary flow phenomena comprising a rotor, said rotor having a plurality of cells in spaced parallel relation about the outer circumference of said rotor and extending from one side of said rotor to a second side of said rotor; means for rotating said rotor around its axis at high speed, said cells each being open at each end; a first stator disc on one side of the rotor; a second stator disc on a second side of the rotor; at least one port in each of said stator discs with one of said stator discs having two ports, said cells registering with said ports, said ports of said pressure transformer being both input and outlet ports for gases that create waves with said cells when said rotor is rotated with respect to said ports, each of said ports having a trailing and leading edge, said trailing edge of one said port in said second stator disc being physically positioned and located with respect to said leading edge of said port in said first stator disc whereby a compression-acceleration wave created at said leading edge of said port in said first stator disc will terminate on said trailing edge of said one port in said second stator disc.

4. A pressure transformer operating on instationary flow phenomena comprising a rotor and two stator discs; said rotor having a plurality of cells in spaced parallel relation about the outer circumference of said rotor and extending from one side of said rotor to a second side of said rotor, said plurality of cells being open at each end, means for rotating said rotor about its axis at high speed while said stator discs remain stationary, said stator discs consisting of a first and second stator disc; said first stator disc positioned on one side of said rotor; said second stator disc positioned on a second side of said rotor, port means in said first and second stator disc, said cell ends registering with said port means during rotation of said rotor, said ports of said pressure transformer being both input and outlet ports for gases that create waves with said cells when said rotor is rotated with respect to said ports, said port means effective to permit available fluid to flow into said rotor cells and effective to permit fluid to flow out of said rotor cells, said fluid flowing out of said rotor cells deriving all of its mass and energy from said fluid flowing into said rotor cells; said port means in said first and second stator disc being physically positioned and located with respect to each other to permit an aero-dynamic interchange of energy whereby said input fluid is transformed into fluids flowing out of said cells which are at second and third pressures unequal to a first pressure of said fluid flowing into said cells, said input and outlet ports being angularly positioned with respect to each other and axially located with respect to each other to permit a wave created by a leading edge of one part in one stator disc to terminate at a trailing edge of an opposite part in the other stator disc.

5. A pressure transformer operating on instationary flow phenomena comprising a rotor, a first stator disc and a second stator disc; means for rotating said rotor about its axis at high speed, said rotor having a plurality of cells in spaced parallel relation about the outer circumference of said rotor and extending from one side of said rotor to a second side of said rotor, said plurality of cells being open at each end, said first stator disc on one side of said rotor, said second stator disc on the other side of said rotor, a single port in said first stator disc, two ports in said second stator disc, said cell ends registering with said ports during rotation of said rotor, said ports of said pressure transformer being both input and outlet ports for gases that create waves with said cells when said rotor is rotated with respect to said ports, said single port in said first stator disc being an input for available fluid; said ports in said second stator disc being outlets for said available fluid after it has been transformed by aerodynamic waves; each of said ports having a leading and trailing edge; said trailing edge of one port in said second stator disc being physically positioned and located with respect to said leading edge of said single port in said first stator disc whereby a compression-acceleration wave created at said last mentioned leading edge will terminate on said last mentioned trailing edge; said trailing edge of said single port in said first stator disc being physically positioned and located with respect to said leading edge of said other port in said second stator disc whereby a compression-deceleration wave created at said last mentioned leading edge will terminate at said last mentioned trailing edge.

6. A pressure transformer operating on instationary flow phenomena comprising a rotor, a first stator disc and a second stator disc; means for rotating said rotor about its axis at high speed, said rotor having a plurality of cells in spaced parallel relation about the outer circumference of said rotor and extending from one side of said rotor to a second side of said rotor, said plurality of cells being open at each end, said first stator disc on one side of said rotor, said second stator disc on the other side of said rotor, a first and second port in said first stator disc, a single port in said second stator disc, said cell ends registering with said ports during rotation of said rotor; said ports of said pressure transformer being both input and outlet ports for gases that create waves with said cells when said rotor is rotated with respect to said ports, said first port in said first stator disc being an input for an available fluid, said second port in said first stator disc and said single port in said second stator disc being outlets for the fluid in the cell which has derived its energy from the available fluid by means of instationary flow phenomena, each of said ports having a leading and trailing edge; said trailing edge of said second port in said first stator disc being physically positioned with respect to said leading edge of said single port in said second stator disc whereby an expansion-deceleration wave created at said last mentioned leading edge terminates on said last mentioned trailing edge; said trailing edge of said single port in said second stator disc being physically positioned and located with respect to said leading edge of said first port in said first stator disc whereby a compression-acceleration wave created at said last mentioned leading edge will terminate at said last mentioned trailing edge.

7. A pressure transformer operating on instationary flow phenomena comprising a rotor, a first stator disc and a second stator disc; means for rotating said rotor about its axis at high speed, said rotor having a plurality of cells in spaced parallel relation about the outer circumference of said rotor and extending from one side of said rotor to a second side of said rotor, said plurality of cells being open at each end, said first stator disc on one side of said rotor, said second stator disc on the other side of said rotor, a single port in said first stator disc, a first and second port in said second stator disc, said cell ends registering with said ports during rotation of said rotor; said ports of said pressure transformer being both input and outlet ports for gases that create waves with said cells when said rotor is rotated with respect to said ports, said first and second ports in said second stator disc being inputs for available fluids, said single port in said first stator disc being an outlet for said available fluids which have had an interchange energy by aerodynamic waves wherein all the energy and mass in the output fluid is derived from the energy of the available fluids, said ports being physically positioned and located with respect to each other to permit instationary flow to create a magnitude of pressure of fluid at said single port to be below the magnitude of fluid pressure in said first port and above the magnitude of fluid pressure in said second port, said input and outlet ports being angularly positioned with respect to each other and axially located with respect to each other to permit a wave created by a leading edge of one part in one stator disc to terminate at a trailing edge of an opposite part in the other stator disc.

8. A pressure transformer operating on instationary flow phenomena comprising a rotor having a plurality of cells in spaced parallel relation about the outer circumference of said rotor and extending from one side of said rotor to a second side of said rotor, means for rotating said rotor about its axis at high speed, said plurality of cells each being open at each end; a first stator disc on a first side of said rotor; a second stator disc on a second side of said rotor, a first and second port in each of said stator plates, said cell ends registering with said ports during rotation of said rotor, said ports of said pressure transformer being both input and outlet ports for gases that create waves with said cells when said rotor is rotated with respect to said ports, said first and second port of said first stator disc being fluid inputs; said first and second port of said second stator disc being fluid outlets; each of said plurality of cells successively passing said first port of said first stator disc said first port of said second stator disc, said second port of said first stator disc and said second port of said second stator disc to complete one cycle of operation; fluid flowing through said fluid outlets of said first and second ports in said second stator disc being the same fluid flowing through said fluid inlets of said first and second ports in said first stator disc but at a different pressure; said ports in said first and second stator disc being physically positioned and located with respect to each other to create a condition in which the pressure of the fluid in said first input port is greater than the pressure of the fluid in either the first or second outlet ports, and the pressure of the fluid in said second input port is less than the fluid in either the first or second outlet ports, said input and outlet ports being angularly positioned with respect to each other and axially located with respect to each other to permit a wave created by a leading edge of one part in one stator disc to terminate at a trailing edge of an opposite part in the other stator disc.

9. A pressure transformer for the interchange of energy between available fluids by means of instationary aerodynamic waves comprising a rotor; a plurality of cells carried by said rotor; means for rotating said rotor around its axis at high speed, said cells each being open at each end; a first stator disc on one side of the rotor; a second stator disc on a second side of the rotor; a pair of ports in each stator disc, said cell ends registering with said ports during rotation of the said rotor; said ports of said pressure transformer being both input and outlet ports for gases that create waves with said cells when said rotor is rotated with respect to said ports, a first port in said first stator disc comprising an input for a first available fluid; a fourth port in said first stator disc comprising an input for a second available fluid; a second and third port in said second stator disc for outlet of the output fluid; said cells successively rotated past said first, second, fourth and third ports; each of said ports having a leading and trailing edge, said trailing edge of said second port physically positioned and located with respect to said leading edge of said fourth port whereby a compression-acceleration wave created at said last mentioned leading edge terminates on said last mentioned trailing edge said trailing edge of said fourth port physically positioned and located with respect to said leading edge of said third port whereby an expansion-acceleration wave created at said last mentioned leading edge terminates at said last mentioned trailing edge; said trailing edge of said first port physically positioned and located with respect to said leading edge of said second port whereby a compression-deceleration wave created at said last mentioned leading edge will terminate at said last mentioned trailing edge.

10. A pressure-converter comprising means establishing a plurality of cells in cylindrical array about an axis, wall means providing pressure chambers for gaseous fluids at the opposite ends of said plurality of cells and under different pressures, said wall means being apertured adjacent each end of said plurality of cells to control the transfer of fluids between the cells and the respective pressure chambers, and means supporting said cells and said apertured wall means for relative rotation to connect said cells in sequence to said pressure chambers to establish pressure waves moving along each cell in sequence thereby to set its contents in motion, the dimensions of said cells and the peripheral lengths and locations of said wall apertures bearing such relation to each other that an end of each cell is opened at the beginning of a pressure wave originating at one end of the cell and is reclosed when the oppositely moving pressure wave arrives at such cell end from the opposite end of the cell.

11. A pressure-converter as recited in claim 10, wherein said pressure chambers include a pair of inlet pressure chambers and an individual outlet pressure chamber for each inlet pressure chamber, each outlet pressure chamber being at the end of said cells opposite its inlet pressure chamber.

References Cited in the file of this patent

UNITED STATES PATENTS

| | | |
|---|---|---|
| 2,399,394 | Seippel | Apr. 30, 1946 |
| 2,461,186 | Seippel | Feb. 8, 1949 |
| 2,705,867 | Lewis | Apr. 12, 1955 |
| 2,738,123 | Hussmann | Mar. 13, 1956 |
| 2,946,184 | Jendrassik | July 26, 1960 |

FOREIGN PATENTS

| | | |
|---|---|---|
| 1,110,779 | France | Oct. 19, 1955 |